United States Patent
Barton et al.

(10) Patent No.: US 11,535,357 B1
(45) Date of Patent: Dec. 27, 2022

(54) CUSTOM AIRCRAFT DOOR MOUNTING SYSTEM

(71) Applicants: Randy L. Barton, Fremont, NE (US); Tracy L. Ogle, Fremont, NE (US)

(72) Inventors: Randy L. Barton, Fremont, NE (US); Tracy L. Ogle, Fremont, NE (US)

( * ) Notice: Subject to any disclaimer, the term of this patent is extended or adjusted under 35 U.S.C. 154(b) by 0 days.

(21) Appl. No.: 17/896,450

(22) Filed: Aug. 26, 2022

Related U.S. Application Data (60) Provisional application No. 63/237,870, filed on Aug. 27, 2021.

(51) Int. Cl.
B64C 1/14 (2006.01)

(52) U.S. Cl.
CPC .......... B64C 1/1438 (2013.01); B64C 1/1415 (2013.01)

(58) Field of Classification Search
CPC ....... B64C 1/1415; B64C 1/1438; B64C 1/14; B64C 1/1423; B64C 1/1407
See application file for complete search history.

(56) References Cited

U.S. PATENT DOCUMENTS

| | | | |
|---|---|---|---|
| 6,189,833 B1 * | 2/2001 | Ambrose | B64C 1/1438 244/129.5 |
| 8,317,135 B2 | 11/2012 | Carter et al. | |
| 2011/0253834 A1 * | 10/2011 | Carter | B64C 1/143 244/129.5 |
| 2015/0108275 A1 * | 4/2015 | Pothier | B64C 1/1438 244/129.5 |
| 2016/0245006 A1 * | 8/2016 | Joussellin | E05D 15/0643 |
| 2018/0148157 A1 * | 5/2018 | Vayssiere | E05D 15/1042 |
| 2019/0375488 A1 * | 12/2019 | Edler | B64C 1/1438 |

* cited by examiner

*Primary Examiner* — Tye William Abell
(74) *Attorney, Agent, or Firm* — Nasr Patent Law LLC; Faisal K. Abou-Nasr (57) ABSTRACT

Aspects of this disclosure relate to a custom aircraft door mounting system that employs a vertical rolling motion enabled assembly, comprising: a first fitting configured to be mounted to an overhead structure of an aircraft, the first fitting including a cam follower slot formed within the first fitting; an elastomeric bearing pivotally coupled to a second fitting; and a cam follower coupled to the elastomeric bearing, the cam follower being configured to slide vertically within the cam follower slot to accommodate relative motion between the second fitting and the overhead structure of the aircraft.

20 Claims, 6 Drawing Sheets

CUSTOM AIRCRAFT DOOR MOUNTING SYSTEM

CROSS-REFERENCE TO RELATED APPLICATIONS

The present application claims the benefit under 35 U.S.C. § 119(e) of U.S. Provisional Application No. 63/237,870, filed Aug. 27, 2021, and titled "CUSTOM AIRCRAFT DOOR MOUNTING SYSTEM," which is incorporated herein by reference in its entirety.

TECHNICAL FIELD

The present disclosure relates to aircraft door systems.

BACKGROUND

Many aircraft, such as helicopters, are standardly equipped with sliding doors for entering or exiting an aircraft. Purchasers of such aircraft may desire to have custom aircraft doors installed as an aftermarket modification. Existing systems typically lack the required range of motion, or they may distort during use due to aircraft motions or vibrations. Consequently, there is a need for mounting assemblies that enable custom aircraft doors to be installed in an effectively secured manner without sacrificing range of motion, or distortion.

SUMMARY

Aspects of this disclosure relate to a custom aircraft door mounting system that includes: a vertical support frame; a horizontal support beam coupled to the vertical support frame; and a vertical rolling motion enabled assembly for mounting the horizontal support beam to an overhead structure of an aircraft. In embodiments, the vertical rolling motion enabled assembly includes a first fitting configured to be mounted to the overhead structure of the aircraft. The first fitting includes a cam follower slot formed within the first fitting. The vertical rolling motion enabled assembly further includes an elastomeric bearing pivotally coupled to the horizontal support beam by a second fitting. The elastomeric bearing is coupled to a cam follower that is configured to slide vertically within the cam follower slot to accommodate relative motion between the horizontal support beam and the overhead structure of the aircraft.

Aspects of this disclosure relate more generally to any vertical rolling motion enabled assembly that includes: a first fitting configured to be mounted to an overhead structure of an aircraft, the first fitting including a cam follower slot formed within the first fitting; an elastomeric bearing pivotally coupled to a second fitting; and a cam follower coupled to the elastomeric bearing, the cam follower being configured to slide vertically within the cam follower slot to accommodate relative motion between the second fitting and the overhead structure of the aircraft.

Aspects of this disclosure also relate more generally to any aircraft door mounting system that includes: a door frame; a first fitting configured to be mounted to the overhead structure of the aircraft, the first fitting including a cam follower slot formed within the first fitting; an elastomeric bearing pivotally coupled to the door frame by a second fitting; and a cam follower coupled to the elastomeric bearing, the cam follower being configured to slide vertically within the cam follower slot to accommodate relative motion between the door frame and the overhead structure of the aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

Figure 1:
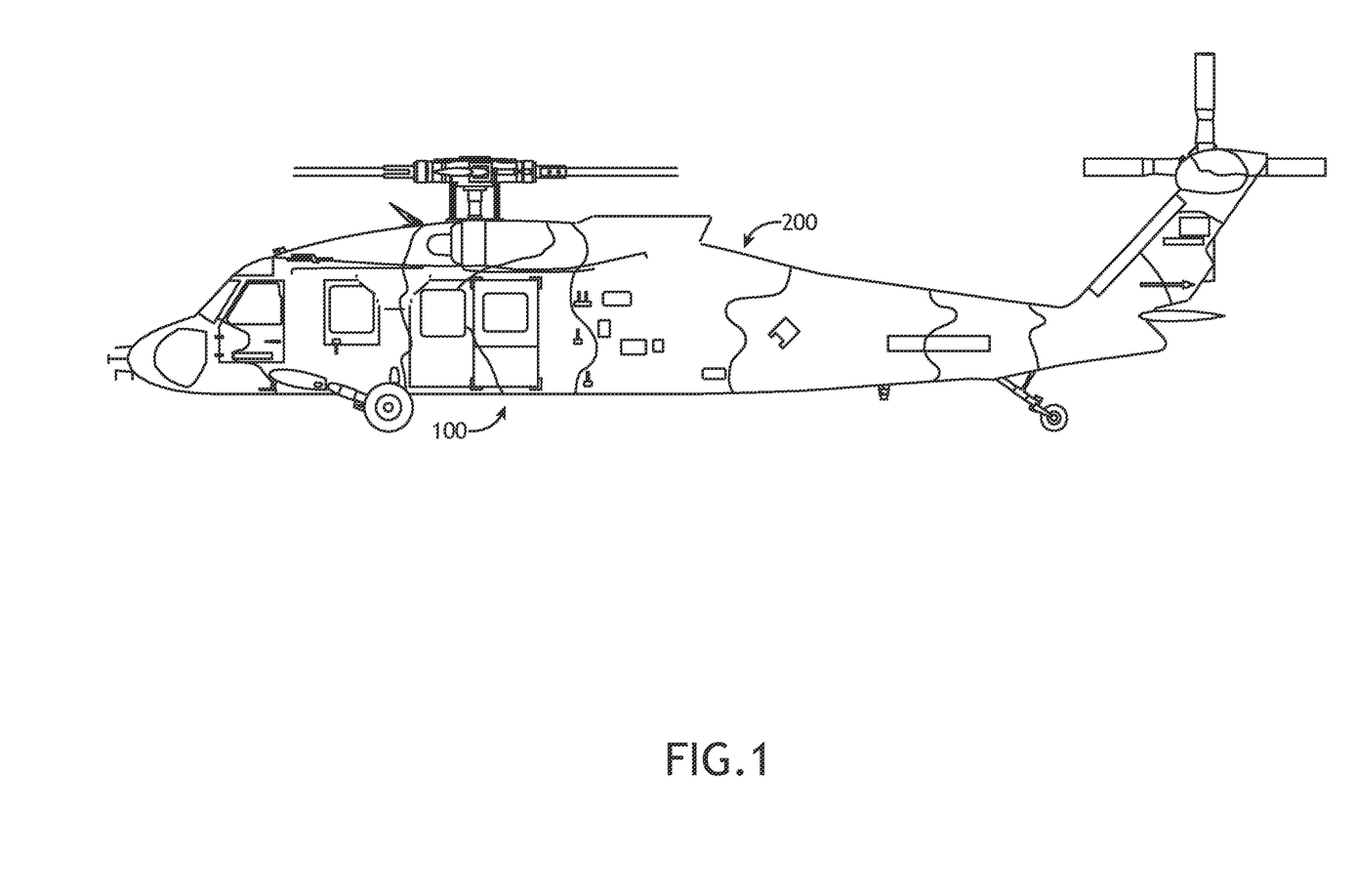
FIG. 1 illustrates an aircraft with a custom door secured by a custom aircraft door mounting system, in accordance with an example embodiment of this disclosure.

FIGS. 1 through 6 illustrate embodiments of a custom aircraft door mounting system that includes a vertical rolling motion enabled assembly to accommodate relative motion between one or more portions of the custom aircraft door mounting system and an overhead structure of an aircraft. For example, FIG. 1 illustrates an aircraft 200 with a custom door secured by a custom aircraft door mounting system 100. Although the aircraft in FIG. 1 is a helicopter, it is contemplated that the custom aircraft door mounting system 100 and/or vertical rolling motion enabled assembly can be installed in any other aircraft or vehicle that requires relative motion between any portion of a door frame/fixture and an overhead structure of the aircraft/vehicle.

Figure 2:
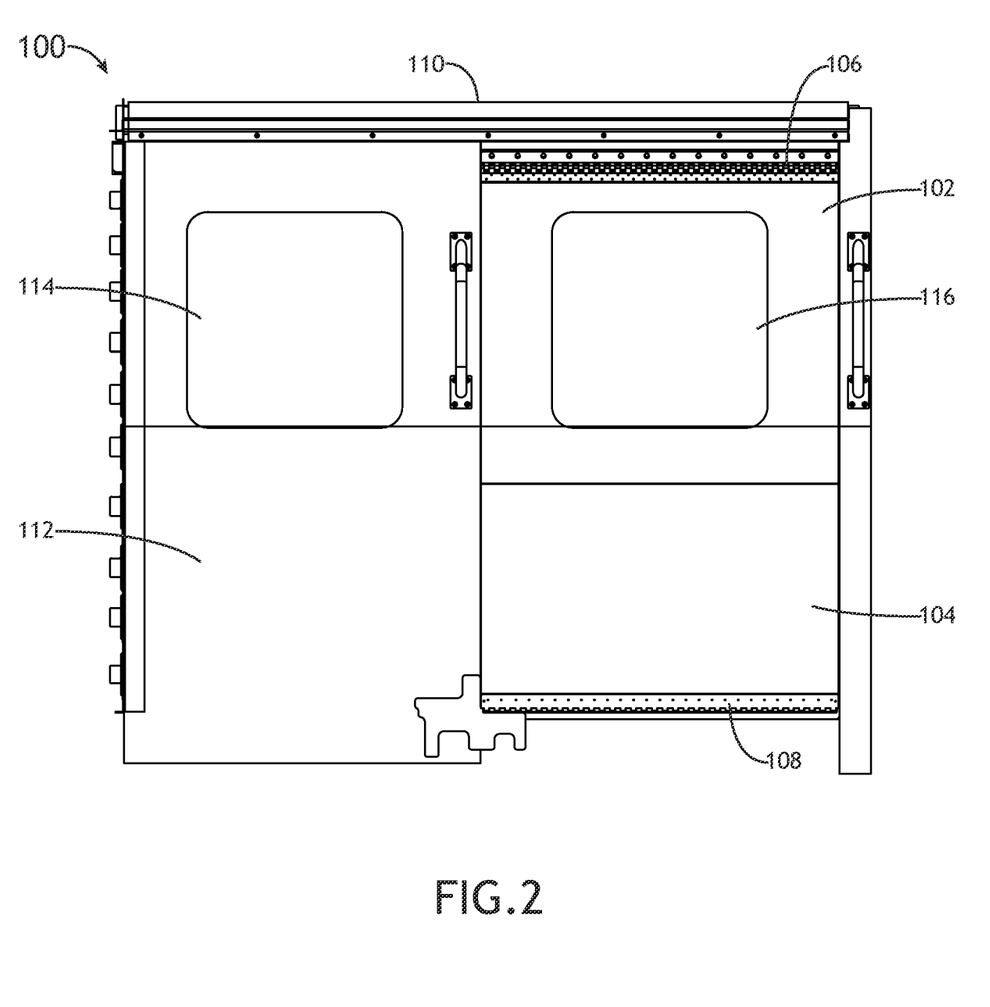
FIG. 2 is a front view of the custom aircraft door mounting system, in accordance with an example embodiment of this disclosure.

FIG. 2 is a front view of the custom aircraft door mounting system 100, in accordance with an example embodiment of this disclosure. As shown in FIG. 2, the custom aircraft door mounting system 100 may include a door frame 110 for a custom door. In an example embodiment, the custom door includes an upper door panel 102 and a lower door panel 104 coupled to the door frame 110 by an upper hinge 106 and a lower hinge 108, respectively. The upper door panel 102 and the lower door panel 104 may be configured to open by pulling apart from one another (vertically). In some embodiments, the lower door panel 104 may include steps that can be used to enter/exit the aircraft 200 when the door panels 102 and 104 are pulled apart. This provides a more convenient mechanism for entering/exiting the aircraft 200 than the sliding doors that come standard on many aircraft.

In some embodiments, at least one of door panels may include a window. For example, in FIG. 2, the upper door panel 102 includes window 116. The custom aircraft door mounting system 100 may further include additional panels 112 and/or windows 114 surrounded by the door frame 110. As discussed later in this document, all of the components surrounded by the door frame 110 may be configured as a preassembled structure, wherein the door frame 110 is configured to be plugged into a door frame sized opening formed within an outer wall of the aircraft 200. Any custom door may be manufactured and sold within a similar door frame structure in a kit that includes components for securing the door frame 110 to the aircraft 200.

Figure 3:
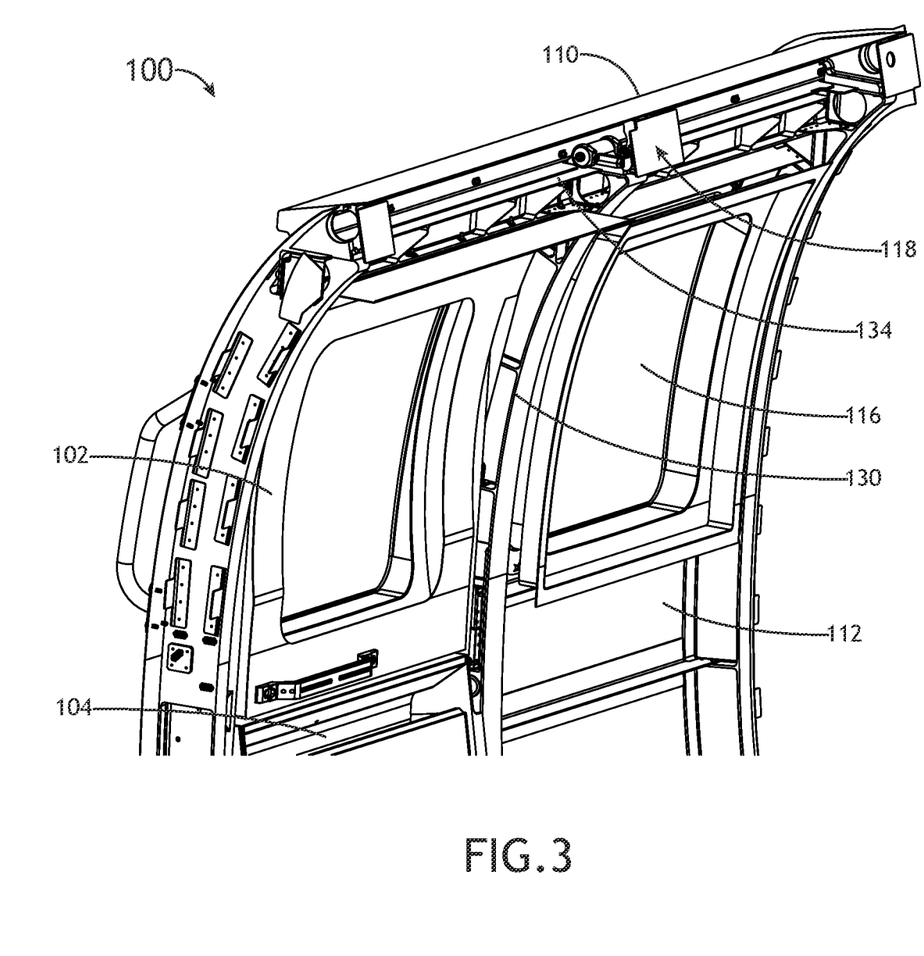
FIG. 3 is a perspective view of an upper portion of the custom aircraft door mounting system, in accordance with an example embodiment of this disclosure.

FIG. 3 is a perspective view of an upper portion of the custom aircraft door mounting system 100, in accordance with an example embodiment of this disclosure. As shown in FIG. 3, the door frame 110 may include one or more vertical support frames 130 (e.g., three vertical support frames) and a horizontal support beam 134 extending across the top of the one or more vertical support frames 130. In embodiments, the custom aircraft door mounting system 100 includes a vertical rolling motion enabled assembly 118 that may be configured for mounting the horizontal support beam 134 to an overhead structure of the aircraft 200 (e.g., to a ceiling structure or cowling of the aircraft 200). Alternatively, the vertical rolling motion enabled assembly 118 may be configured to couple a vertical support frame 130 directly to the overhead structure of the aircraft 200 or configured to couple a different portion of the door frame 110 to the overhead structure of the aircraft 200.

Figure 4:
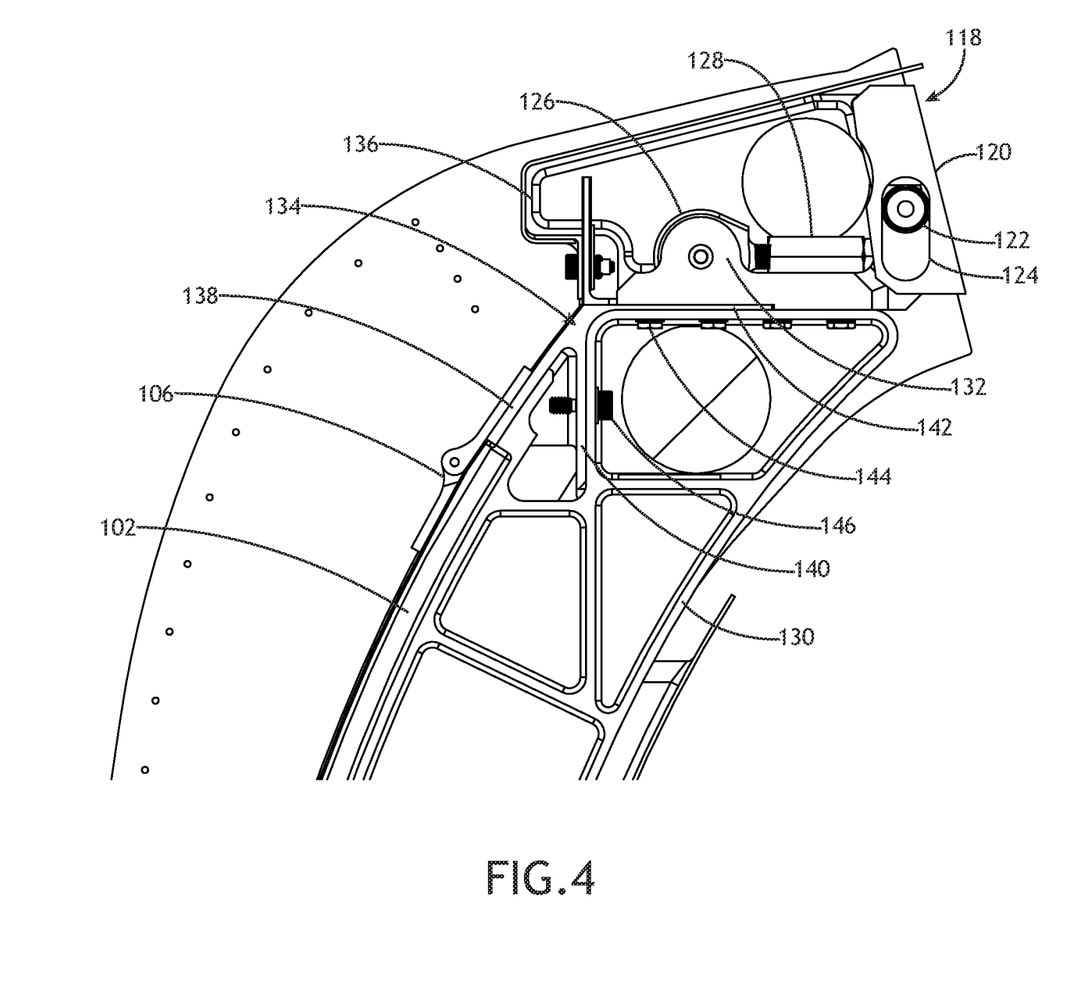
FIG. 4 is a cross-sectional view of an upper portion of the custom aircraft door mounting system, in accordance with an example embodiment of this disclosure.

A detailed view of the vertical rolling motion enabled assembly 118 is provided in FIG. 4, which is a cross-sectional view of an upper portion of the custom aircraft door mounting system 100, in accordance with an example embodiment of this disclosure. As shown in FIG. 4, the vertical rolling motion enabled assembly 118 includes a first fitting 120 configured to be mounted to the overhead structure of the aircraft 200. The first fitting 120 includes a cam follower slot 124 formed within the first fitting 120. The vertical rolling motion enabled assembly 118 further includes an elastomeric bearing 126 pivotally coupled to the horizontal support beam 134 by a second fitting 132.

The elastomeric bearing 126 is coupled to a cam follower 122 that is configured to slide vertically (e.g., up and down) within the cam follower slot 124 to accommodate relative motion between the horizontal support beam 134 and the overhead structure of the aircraft 200. In some embodiments, the cam follower is coupled to the elastomeric bearing by an adjustable tension rod 128. The adjustable tension rod 128 may comprise a threaded rod and a cooperatively threaded sleeve that is configured to extend or retract in response to being rotated about the threaded rod. Alternatively, the adjustable tension rod 128 may employ a ratcheting mechanism, a pneumatic cylinder, a spring loaded cylinder, or any length adjustment interface.

In the embodiment illustrated in FIG. 4, the second fitting 134 is coupled to the horizontal support beam 134 and the vertical support frame 130 by one or more fasteners 144 extending through the vertical support frame 130, the horizontal support beam 134, and the second fitting 134. For example, in FIG. 4, the fasteners 144 extend through an upper surface of the vertical support frame 130 that is in contact with an inner planar section 142 of the horizontal support beam 134.

The horizontal support beam 134 may comprise an outer planar section 138, a middle planar section 140, and an inner planar section 142 that intersect with one another at a longitudinal axis of the horizontal support beam 134. In some embodiments, the outer planar section 138 and the middle planar section 140 are separated by an acute angle; meanwhile, the middle planar section 140 and the inner planar section 142 are separated by a 90 degree or approximately 90 degree angle (e.g., +/−5 degrees). The outer planar section 138, the middle planar section 140, and the inner planar section 142 may be cast as a single structure or welded together to form the horizontal support beam 134.

In embodiments, the outer planar section 138 defines at least a portion of an interface between the horizontal support beam 134 and the custom door. For example, the outer planar section 138 may be coupled to the upper hinge 106 that connects the upper door panel 102 to the rest of the custom aircraft door mounting system 100.

The middle planar section 140 may define at least a portion of an interface between the horizontal support beam 134 and a vertical surface at a portion of the vertical support frame 130. For example, the middle planar section 140 may be in contact with the vertical surface and may be coupled to the vertical support frame 130 by one or more fasteners 144 extending through the vertical surface at the portion of the vertical support frame 130 and the middle planar section 140 of the horizontal support beam 134.

The inner planar section may define at least a portion of an interface between the horizontal support beam 134, the second fitting 132, and a horizontal surface at an upper end of the vertical support frame 130. For example, as discussed above, the second fitting 134 may be coupled to the horizontal support beam 134 and the vertical support frame 130 by one or more fasteners 144 extending through the upper surface (i.e., the horizontal surface at the upper end) of the vertical support frame 130, the horizontal support beam 134, and the second fitting 134.

In some embodiments, the custom aircraft door mounting system 100 further includes a closeout structure 136 between the vertical rolling motion enabled assembly 118 and a cowling or catwalk of the aircraft 200. For example, the closeout structure 136 may comprise a filler and/or a shell that protects the underlying components from water, air, and/or debris that may enter between the door frame 110 and the cowling or catwalk of the aircraft 200.

Figure 6:
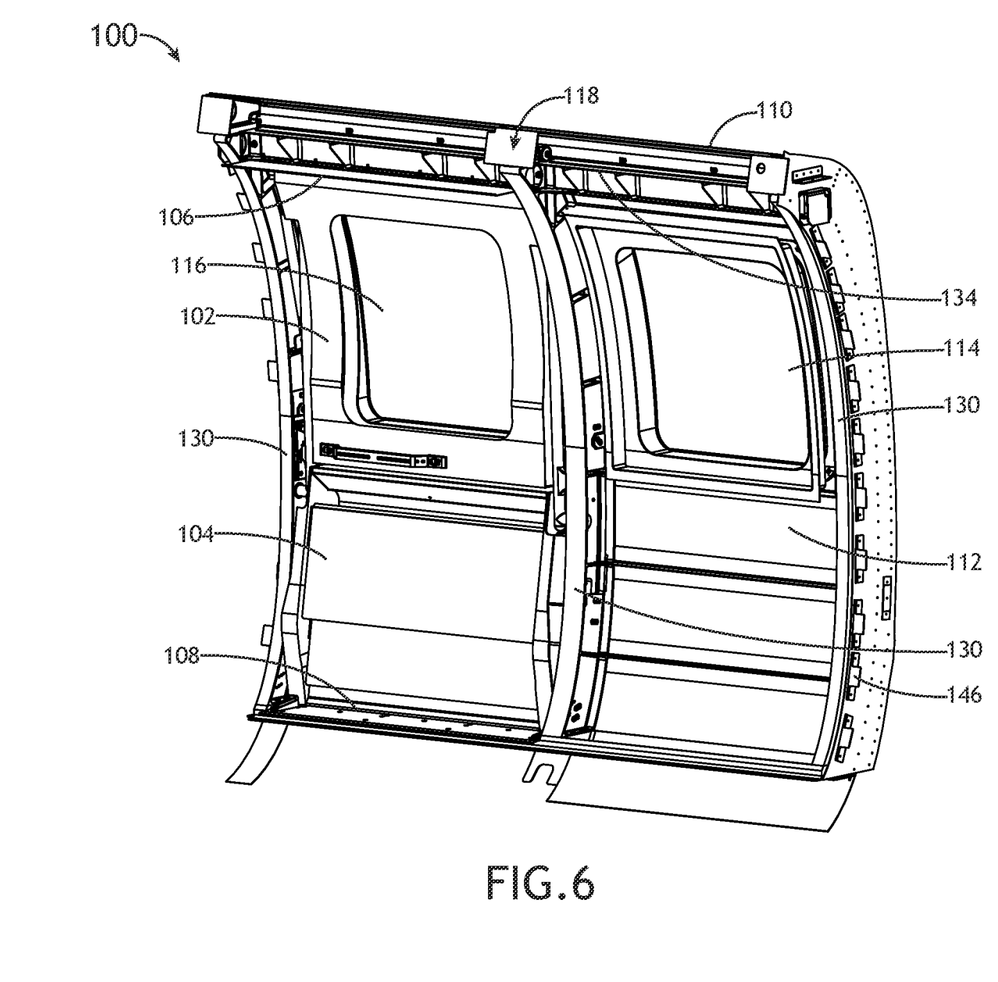
FIG. 6 is a perspective rear view of the custom aircraft door mounting system in a preassembled configuration, in accordance with an example embodiment of this disclosure.

Referring now to FIG. 6, the custom aircraft door mounting system 100 may include more than one vertical support frame 130. For example, in the embodiment illustrated in FIG. 6, the custom aircraft door mounting system 100 includes three vertical support frames 130 (e.g., forward, center, and aft support frames). The custom aircraft door mounting system 100 may include any number of vertical support frames 130, but it is generally preferred that there be at least two vertical support frames 130. The outermost vertical support frames 130 may form outer edges of the door frame 110 structure.

Figure 5:
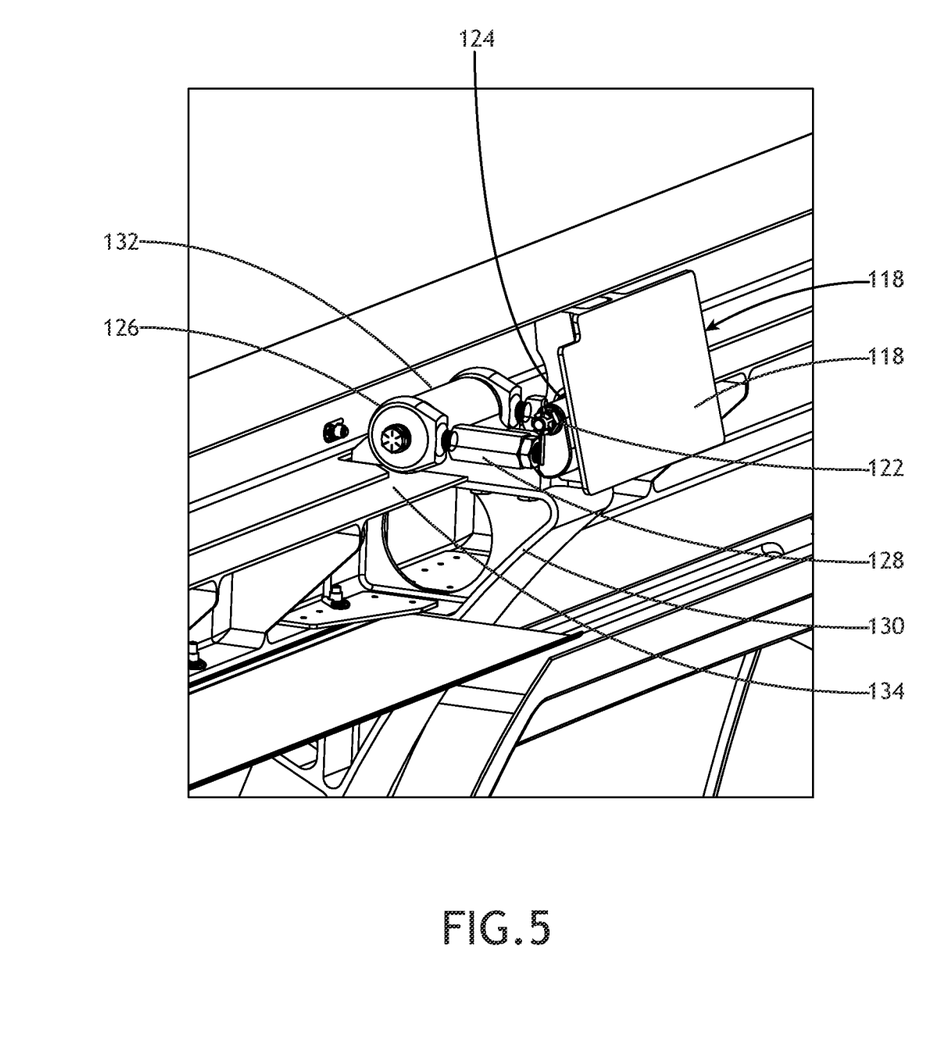
FIG. 5 illustrates a portion of the custom aircraft door mounting system including a vertical rolling motion enabled assembly for mounting a horizontal support beam of a door frame to an overhead structure of an aircraft and to a vertical support frame that extends from a lower portion (e.g., floor or underfloor structure) of the aircraft to the horizontal support beam, in accordance with an example embodiment of this disclosure.

As shown in FIGS. 5 and 6, the horizontal support beam 134 extends across the top(s) of the support frame(s) 130. For example, in FIG. 6, the horizontal support beam 134 is attached to the tops of the three (forward, center, and aft) vertical support frames 130. Furthermore, although the custom aircraft door mounting system 100 is shown to include one vertical rolling motion enabled assembly 118 coupled to the central vertical support frame 130, in some embodiments, it may be beneficial for the custom aircraft door mounting system 100 to include a plurality of vertical rolling motion enabled assemblies 118 (e.g., attached to respective ones of multiple vertical support frames 130).

The vertical support frame(s) 130 may extend from a lower portion (e.g., floor or underfloor structure) of the aircraft to the horizontal support beam 134, and the vertical support frame(s) 130 may be directly or indirectly coupled to the custom door. For example, in FIG. 6, the upper door panel 102 is coupled to each of two vertical support frames 130 by an upper hinge 106, and the lower door panel 104 is coupled each of the two vertical support frames 130 by a lower hinge 108. In some embodiments, the door panels 102, 104 may be indirectly coupled to the vertical support frames 130 by an intermediate structure such as the horizontal support beam 134 extending across the tops of the vertical support frames 130 or a lower support beam extending across the bottoms of the vertical support frames 130.

As previously mentioned, all of the components surrounded by an outer perimeter of the door frame 110 may be configured as a preassembled structure, wherein the door frame 110 is configured to be plugged into a door frame sized opening formed within an outer wall of the aircraft 200. Any custom door may be manufactured and sold within a similar door frame structure in a kit that includes components for securing the door frame 110 to the aircraft 200. For example, as shown in FIG. 6, the vertical support frame(s) 130, the horizontal support beam 134, the vertical rolling motion enabled assembly 118, and the custom door (panels 102, 104) are configured as a preassembled structure that is bound by the outer perimeter of the door frame 110.

The door frame 110 is configured to be plugged into a door frame sized opening formed within an outer wall of the aircraft 200. For example, the door frame 110 includes a plurality of brackets 146 formed about its perimeter for mounting the door frame 110 after forming the door frame sized opening in the outer wall of the aircraft 200. In this regard, the custom aircraft door mounting system 100 can be manufactured as a door "plug" that may be part of a kit with components for coupling the preassembled structure (i.e., the "plug") to the aircraft 200. The door plug (as shown in FIG. 6) can be a stand alone structure, like a walk frame, where the forward and aft vertical support frames 130 tie into sidewall frames of the aircraft 130 and the horizontal support beam 134 is tied to a top frame of the aircraft 200 and held to the longeron of the aircraft 200 by the vertical rolling motion enabled assembly 118. The vertical rolling motion enabled assembly 118 serves to isolate vertical movement of the aircraft upper deck from the rigid door plug structure and allows the area under the catwalk or cowling of the aircraft to be filler with no structural value.

The custom aircraft door mounting system 100 removes all load from transferring from the upper cabin structure of the aircraft 200 to the door frame 110, while the elastomeric bearing 126 of the vertical rolling motion enabled assembly 118 reduces any vibration that is transmitted from the airframe of the aircraft 200. Furthermore, the custom aircraft door mounting system 100 allows for cabin stretch through the use of the vertical rolling motion enabled assembly 118 (including elastomeric bearing 126, adjustable tension rod 128, and cam follower 122) to couple the door frame 110 to the longeron of the aircraft 200.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. An aircraft door mounting system, comprising:
    a vertical support frame;
    a horizontal support beam coupled to the vertical support frame; and
    a vertical rolling motion enabled assembly for mounting the horizontal support beam to an overhead structure of an aircraft, the vertical rolling motion enabled assembly comprising:
        a first fitting configured to be mounted to the overhead structure of the aircraft, the first fitting including a cam follower slot formed within the first fitting;
        an elastomeric bearing pivotally coupled to the horizontal support beam by a second fitting; and
        a cam follower coupled to the elastomeric bearing, the cam follower being configured to slide vertically within the cam follower slot to accommodate relative motion between the horizontal support beam and the overhead structure of the aircraft.

2. The aircraft door mounting system of claim 1, wherein the second fitting is coupled to the horizontal support beam and the vertical support frame by one or more fasteners extending through the vertical support frame, the horizontal support beam, and the second fitting.

3. The aircraft door mounting system of claim 1, further comprising:
    a closeout structure between the vertical rolling motion enabled assembly and a cowling or catwalk of the aircraft.

4. The aircraft door mounting system of claim 1, wherein the cam follower is coupled to the elastomeric bearing by an adjustable tension rod.

5. The aircraft door mounting system of claim 4, wherein the adjustable tension rod comprises a threaded rod and a cooperatively threaded sleeve that is configured to extend or retract in response to being rotated about the threaded rod.

6. The aircraft door mounting system of claim 1, wherein the horizontal support beam comprises an outer planar section, a middle planar section, and an inner planar section that intersect with one another at a longitudinal axis of the horizontal support beam.

7. The aircraft door mounting system of claim 6, wherein the outer planar section, the middle planar section, and the inner planar section are cast as a single structure or welded together.

8. The aircraft door mounting system of claim 6, wherein the outer planar section defines at least a portion of an interface between the horizontal support beam and a custom door.

9. The aircraft door mounting system of claim 6, wherein the middle planar section defines at least a portion of an interface between the horizontal support beam and a vertical surface of the vertical support frame.

10. The aircraft door mounting system of claim 6, wherein the inner planar section defines at least a portion of an interface between the horizontal support beam, the second fitting, and a horizontal surface of the vertical support frame.

11. The aircraft door mounting system of claim 1, wherein the vertical support frame is coupled to a custom door.

12. The aircraft door mounting system of claim 11, wherein the custom door comprises:
an upper door panel coupled to the vertical support frame by an upper hinge; and
a lower door panel coupled to the vertical support frame by a lower hinge.

13. The aircraft door mounting system of claim 11, wherein the vertical support frame, the horizontal support beam, the vertical rolling motion enabled assembly, and the custom door are configured as a preassembled structure surrounded by a door frame that is configured to be plugged into a door frame sized opening formed within an outer wall of the aircraft.

14. The aircraft door mounting system of claim 13 in a kit configuration with components for coupling the preassembled structure to the aircraft.

15. A vertical rolling motion enabled assembly, comprising:
a first fitting configured to be mounted to an overhead structure of an aircraft, the first fitting including a cam follower slot formed within the first fitting;
an elastomeric bearing pivotally coupled to a second fitting; and
a cam follower coupled to the elastomeric bearing, the cam follower being configured to slide vertically within the cam follower slot to accommodate relative motion between the second fitting and the overhead structure of the aircraft.

16. The vertical rolling motion enabled assembly of claim 15, wherein the cam follower is coupled to the elastomeric bearing by an adjustable tension rod.

17. The vertical rolling motion enabled assembly of claim 16, wherein the adjustable tension rod comprises a threaded rod and a cooperatively threaded sleeve that is configured to extend or retract in response to being rotated about the threaded rod.

18. An aircraft door mounting system, comprising:
a door frame;
a first fitting configured to be mounted to the overhead structure of the aircraft, the first fitting including a cam follower slot formed within the first fitting;
an elastomeric bearing pivotally coupled to the door frame by a second fitting; and
a cam follower coupled to the elastomeric bearing, the cam follower being configured to slide vertically within the cam follower slot to accommodate relative motion between the door frame and the overhead structure of the aircraft.

19. The aircraft door mounting system of claim 18, wherein the cam follower is coupled to the elastomeric bearing by an adjustable tension rod.

20. The aircraft door mounting system of claim 19, wherein the adjustable tension rod comprises a threaded rod and a cooperatively threaded sleeve that is configured to extend or retract in response to being rotated about the threaded rod.

* * * * *